(12) United States Patent
Vanhee et al.

(10) Patent No.: US 11,973,398 B2
(45) Date of Patent: Apr. 30, 2024

(54) ELECTRIC MOTOR COOLING SYSTEM AND METHOD FOR OPERATION OF SAID SYSTEM

(71) Applicant: Dana Belgium N.V., Bruges (BE)

(72) Inventors: Steven Vanhee, Staden (BE); Shawn P. A. Jackson, Ghent (BE); Maximilian Hombsch, Begijnendijk (BE)

(73) Assignee: DANA BELGIUM N.V., Bruges (BE)

( * ) Notice: Subject to any disclaimer, the term of this patent is extended or adjusted under 35 U.S.C. 154(b) by 159 days.

(21) Appl. No.: 17/216,377

(22) Filed: Mar. 29, 2021

(65) Prior Publication Data

US 2021/0305876 A1 Sep. 30, 2021

Related U.S. Application Data

(60) Provisional application No. 63/002,808, filed on Mar. 31, 2020.

(51) Int. Cl.
*H02K 5/20* (2006.01)
*H02K 1/20* (2006.01)
*H02K 9/06* (2006.01)

(52) U.S. Cl.
CPC .............. *H02K 5/207* (2021.01); *H02K 1/20* (2013.01); *H02K 9/06* (2013.01)

(58) Field of Classification Search
CPC ............ H02K 5/207; H02K 1/20; H02K 9/06; H02K 1/32; H02K 5/18; H02K 9/19; H02K 9/08
See application file for complete search history.

(56) References Cited

U.S. PATENT DOCUMENTS

| 5,780,946 A | 7/1998 | Nakamura et al. |
| 6,700,237 B1 | 3/2004 | Yang et al. |
| 8,120,227 B2* | 2/2012 | Leroy .................... H02K 9/223 310/214 |
| 10,536,044 B2* | 1/2020 | Lee ......................... H02K 3/527 |
| 2019/0157923 A1* | 5/2019 | Morgante ............... H02K 5/203 |
| 2019/0229571 A1* | 7/2019 | Yasuda .................... H02K 1/32 |

FOREIGN PATENT DOCUMENTS

| JP | 2002252942 A | 9/2002 | |
| JP | 2003143809 A * | 5/2003 | ............... H02K 9/16 |
| JP | 2016015811 A | 1/2016 | |

OTHER PUBLICATIONS

Machine translation of 2002252942 (Year: 2002).*
Machine translation of JP 2003143809 A (Year: 2003).*

* cited by examiner

*Primary Examiner* — Bernard Rojas
(74) *Attorney, Agent, or Firm* — McCoy Russell LLP

(57) ABSTRACT

Methods and systems for cooling an electric motor are provided. An electric motor system, in one example, comprises a rotor with a plurality of axial air conduits, a first balancing plate positioned on a first axial side of the rotor, the first balancing plate comprising an inlet air duct and an outlet air duct, and a second balancing plate positioned on a second axial side of the rotor, the second balancing plate comprising an inlet air duct and an outlet air duct. In the electric motor system, the inlet air duct in the first balancing plate is radially offset from the inlet air duct in the second balancing plate.

19 Claims, 6 Drawing Sheets

ELECTRIC MOTOR COOLING SYSTEM AND METHOD FOR OPERATION OF SAID SYSTEM

CROSS REFERENCE TO RELATED APPLICATION

This application claims priority to U.S. Provisional Application No. 63/002,808 entitled "ELECTRIC MOTOR COOLING SYSTEM AND METHOD FOR OPERATION OF SAID SYSTEM" filed Mar. 31, 2020, the entire contents of which is whereby incorporated by reference in its entirety for all purposes.

TECHNICAL FIELD

The present disclosure relates to systems and methods for cooling electric motors.

BACKGROUND

A motor's thermodynamic characteristics influence motor performance. Some electric motors utilize cooling jackets (e.g., water or oil cooling jackets) to remove heat from the motor's stator. Cooling fins extending from a motor housing may also be used to cool electric motors. However, previous air and liquid cooling arrangements may not achieve desired cooling targets of the internal motor components, in certain motors. For example, in certain motors additional stator end winding and rotor lamination cooling may be desired. These cooling challenges may be more pronounced in motors with relatively high power densities.

SUMMARY

To overcome at least some of the aforementioned challenges an electric motor system is provided. In one example, the system includes a rotor with a plurality of axial air conduits. The system further includes a first balancing plate positioned on a first axial side of the rotor. The first balancing plate comprises an inlet air duct and an outlet air duct. Specifically, in one example, the first balancing plate includes multiple inlets and outlets sequentially arranged. The system also includes a second balancing plate positioned on a second axial side of the rotor. The second balancing plate comprises an inlet air duct and an outlet air duct. Additionally, in the system the inlet air duct in the first balancing plate is radially offset from the inlet air duct in the second balancing plate. Radially offsetting the ducts allows suction and exhaust strokes driven via centrifugal forces to be achieved in the system. Thus, air circulation through the air ducts and conduits occurs while the rotor rotates, driving rotor core cooling. Motor efficiency is increased as a result of the air cooling.

In another example, the outlet air duct in the first balancing plate may direct air toward a first stator end winding and the outlet air duct in the second balancing plate may direct air toward a second stator end winding. Directing airflow (e.g., turbulent airflow) near the end windings allows for additional motor cooling, further increasing motor efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-6 and 9 are drawn approximately to scale. However, other relative dimensions of the components may be used, in other embodiments.

DETAILED DESCRIPTION

A system for efficiently air cooling an electric motor is described herein. The system includes conduits extending through a rotor and ducts in rotor balancing plates. These conduits and ducts route air through the rotor and expel air near stator end windings, in some cases, to achieve desired cooling. To elaborate, in one example, air may be heated as is flows through rotor laminations and around the stator end windings and then cooled as it travels through sections of the motor's end cap and/or housing. The airflow may be passively generated via centrifugal forces, in some examples. In this way, rotor and end winding cooling may be achieved using a robust system without the use of active control schemes, in some cases. The system's cost is therefore reduced and the reliability of the system is increased in comparison to actively controlled motor cooling systems. However, it will be appreciated that in some embodiments, the system may also include a liquid cooling system with an actively controlled pump working in tandem with the air cooling system. For instance, coolant passages may, in such an example, traverse the rotor core adjacent to the air conduits. Providing air and in some cases liquid cooling to the rotor core enables motor efficiency to be increased, if desired.

Figure 1:
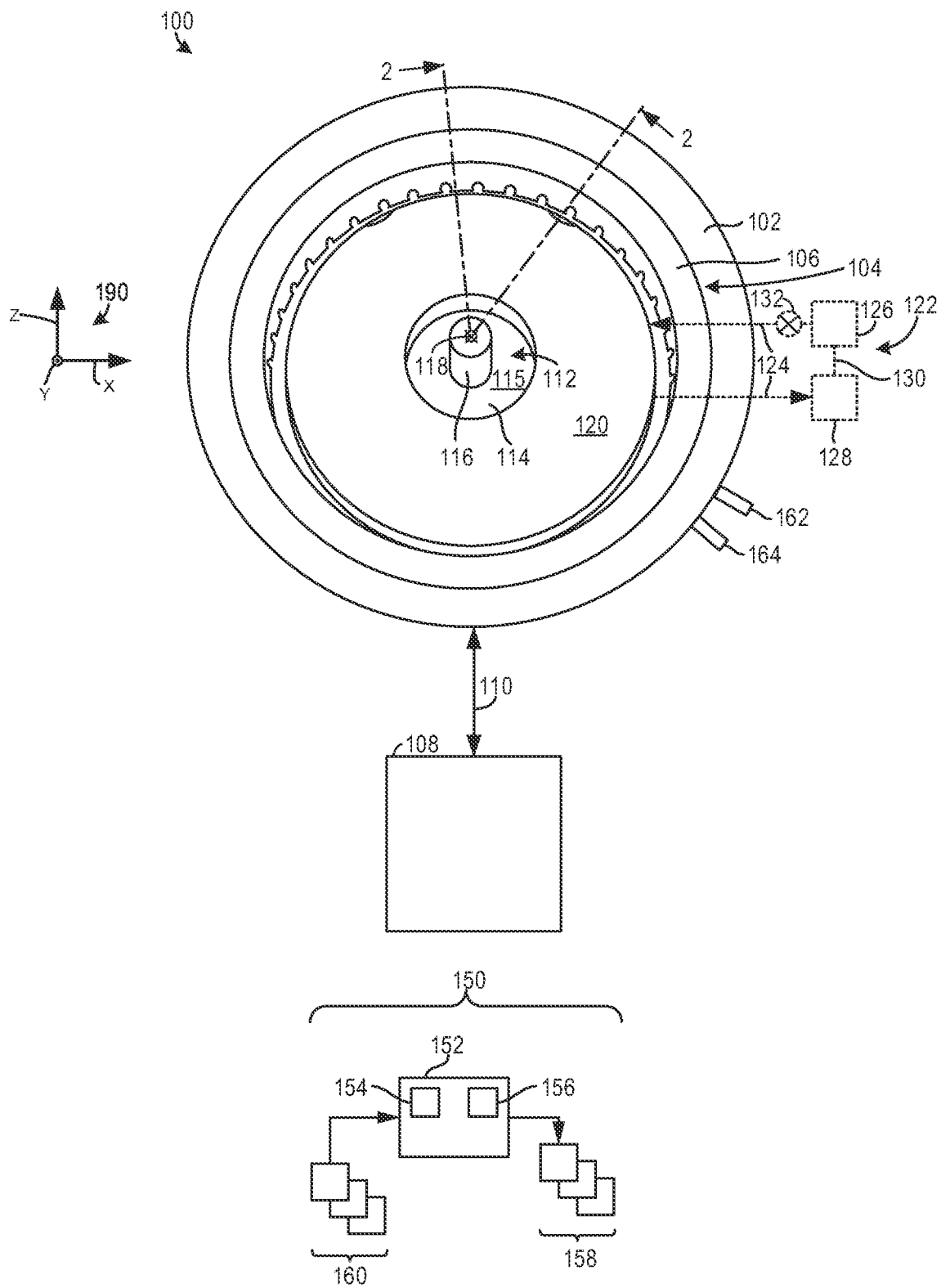
FIG. 1 shows an end view of an electric motor.

FIG. 1 illustrates a cross-sectional view of an example of an electric motor 100. It will be appreciated that the cross-sectional view of FIG. 1 is taken through a radially aligned plane. The electric motor 100 may be deployed in variety of operating environments including: automotive applications (e.g., light, medium, and heavy duty vehicles), industrial settings, agricultural equipment, etc. For instance, in one use-case scenario, the electric motor 100 may be integrated into a hybrid vehicle or battery electric vehicle (BEV).

A variety of suitable electric motor configurations may be used depending on the end-use design goals. For example, the motor may be an alternating current (AC) motor or a direct current (DC) motor. AC motor types include asynchronous (e.g., squirrel cage and wound rotor) and synchronous style motors. Synchronous motors such as multiphase, may be used in certain embodiments. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

The electric motor 100 includes a housing 102 that encloses internal components. A stator 104 including a first end winding 106 may be enclosed via the housing 102. The end winding 106 may include a plurality of wound or hairpin wires (e.g., round wires, rectangular wires, flat wires, etc.) which are outside a core of the stator 104. However, it will be appreciated that the stator core also includes wire sections which extend therethrough. Further, the stator 104 may receive electrical energy from an energy storage device 108 (e.g., battery, capacitor, and the like) and in some cases, such as when the motor is designed with regeneration functionality, transfer electrical energy to the energy storage device 108. Arrow 110 denotes this energy transfer. The electric motor further includes a rotor 112 with a core 114 a rotor shaft 116 rotating about axis 118. The rotational axis 118 is also provided in FIGS. 2-7 for reference. It will be understood that a radial direction is any direction perpendicular to the rotational axis 118. Additionally, an axis system 190 including an x-axis, y-axis, and z-axis is also provided in FIGS. 1-7 and 9, for reference. The z-axis may be a vertical axis, the x-axis may be a lateral axis, and/or the y-axis may be a longitudinal axis, in one example. However, the axes may have other orientations, in other examples. It will be appreciated that the electric motor may be designed to generate rotational output in a first rotational direction and, in certain examples, a second rotational direction. Further, in some examples, the electric motor may be designed to operate in a regeneration mode where the motor receives rotational input and generates electrical energy responsive to receiving the rotational input.

The rotor core 114 may include a plurality of metal laminations 115 (e.g., laminated magnetic steel or iron) or a solid magnetic metal. Thus, the rotor core 114 includes a magnetically interactive portion (e.g., permanent magnet or electromagnet). It will be appreciated that during motor operation the rotor 112 may rotate while the stator 104 is held relatively stationary.

The stator 104 and the rotor 112 are configured to electrically interact to generate a rotational output and, in some cases, generate electrical energy responsive to receiving a rotational input from an external source such as a vehicle gear-train, in one use-case example. However, as mentioned above, the motor may be used in wide variety of operating environments. As such, the electric motor 100 is configured to generate rotational output and, in some examples, in a regeneration mode, receive rotational input and generate electrical energy output. Thus, the electric motor 100 may be designed to receive electrical energy from the energy storage device 108 and, in some examples, transfer energy to the energy storage device. Wired and/or wireless energy transfer mechanisms may be used to facilitate this energy transfer functionality.

A first balancing plate 120 is shown attached to the rotor core 114. The balancing plate 120 may be designed to account for imbalances in the rotor 112. To elaborate, the mass and mass distribution of the first balancing plate 120 and a second balancing plate, described in greater detail herein, may be selected to counterbalance residual unbalanced forces in the motor. In other words, the balancing plates may provide cooling airflow dynamics, discussed in greater detail herein, as well as substantial counterbalance functionality, in one example. FIG. 1 also shows a cutting plane 2-2 indicating the location of the cross-sectional view illustrated in FIG. 2.

In another embodiment, a liquid cooling system 122 configured to circulate a working fluid (e.g., water, a mixture of water and glycol, oil, and the like) through the rotor core 114 may be included in the electric motor 100. As shown, the liquid cooling system 122 may include fluid passages 124, indicated via arrows, routing cooling into the rotor core 114. Additionally, fluid passage 240, shown in FIG. 2, may traverse (e.g., axially traverse) the rotor core 114.

Figure 9:
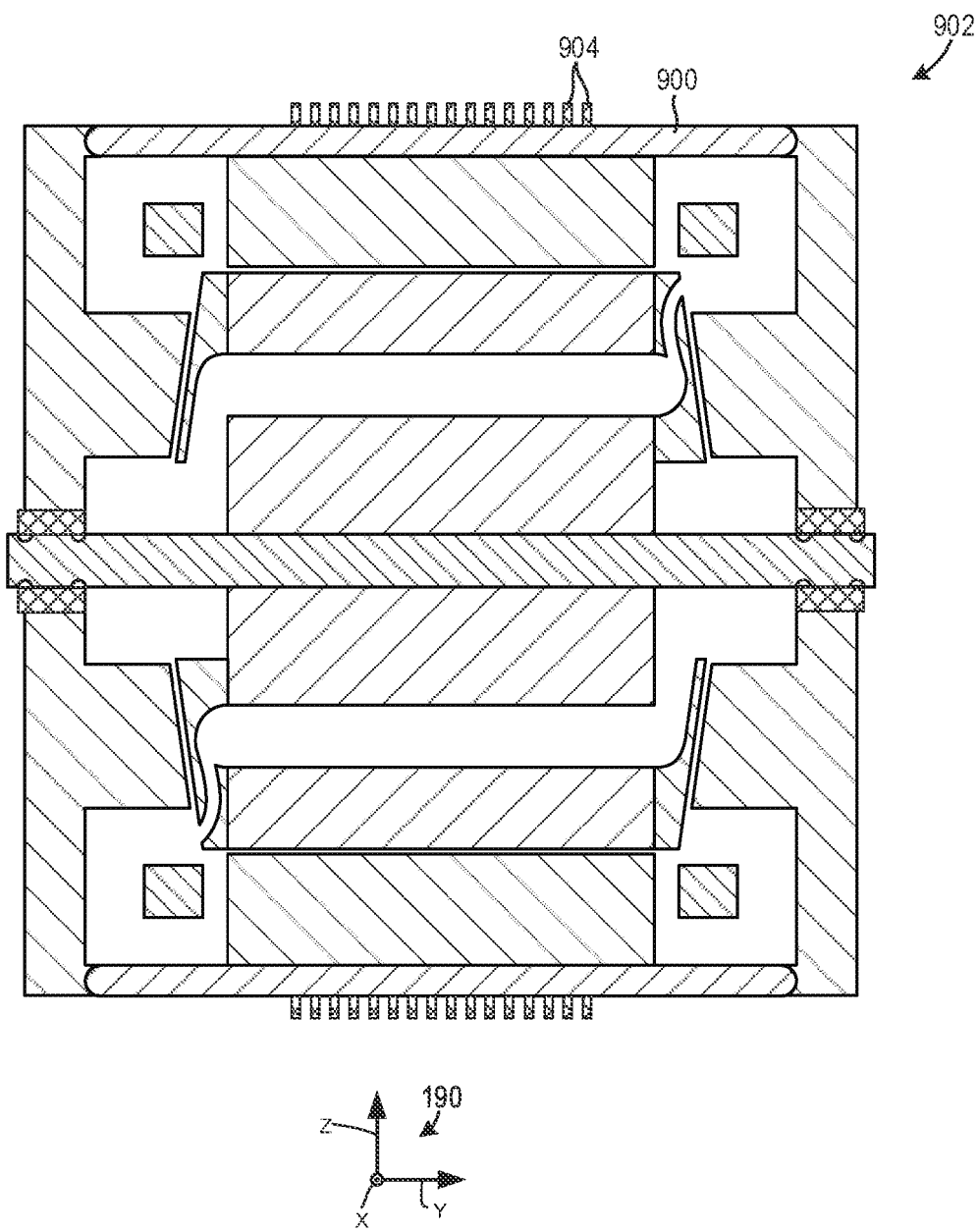
FIG. 9 shows another example of a cooling system in an electric motor.

In yet another example, shown in FIG. 9, a housing 900 of an electric motor 902 may include fins 904. The fins extend outward from the housing and enable housing cooling through natural and/or forced convection. In yet another example, the housing may additionally or alternatively include a water jacket through which coolant is circulated to remove heat therefrom. Specifically, the water jacket may flow coolant around the periphery of the housing. The motor 902, shown in FIG. 9, shares other common features with the electric motor 100, shown in FIGS. 1-2 and reductant description of these overlapping features is omitted for concision.

A pump 126 in fluidic communication with a heat exchanger 128, schematically depicted via boxes, may also be included in the liquid cooling system 122. A fluid line 130 extends between the pump 126 and the heat exchanger 128. The pump 126 is configured to circulate the fluid through the passages 124 and the heat exchanger 128 is designed to transfer heat from the fluid flowing therethrough to the surrounding environment. In one example, the pump 126 may be configured to adjust the flowrate of the coolant circulating through the coolant loop. The pump 126 and heat exchanger 128 may include conventional components to achieve the aforementioned functionality. For instance, the pump may include a housing, chambers, passages, valves, piston, etc. The heat exchanger may include a housing, passages, heat fins, etc. The liquid cooling system 122 may also include a valve 132 configured to actively adjust fluid flow. However, the valve may be omitted from the liquid cooling system, in other embodiments. Still further in other embodiments, the liquid cooling system may be omitted from the electric motor 100.

The electric motor 100 may be coupled to a control system 150 with a controller 152. The controller 152 includes a processor 154 (e.g., a microprocessor unit and/or other types of circuits) and memory 156 (e.g., random access memory, read only memory, keep alive memory, combinations thereof, etc.). The controller 152 may be configured to send control commands to system components 158 as well as receive signals from sensors 160 and other suitable components. The controllable components may include the electric motor 100 (e.g., the motor's stator). It will be understood that the controllable components may include actuators to enable the component adjustment. The sensors may include a motor temperature sensor 162, a rotor position sensor 164, etc. As such, the controller 152 may receive a signal indicative of the motor's speed and adjust the output of the motor based on the speed signal. The other controllable components in the electric motor may function in a similar manner. For instance, pump 126 and valve 132 in the liquid cooling system 122 may receive control commands from the controller. Furthermore, it will be understood that the controller 152 may send and receive signals via wired and/or wireless communication.

Figure 2:
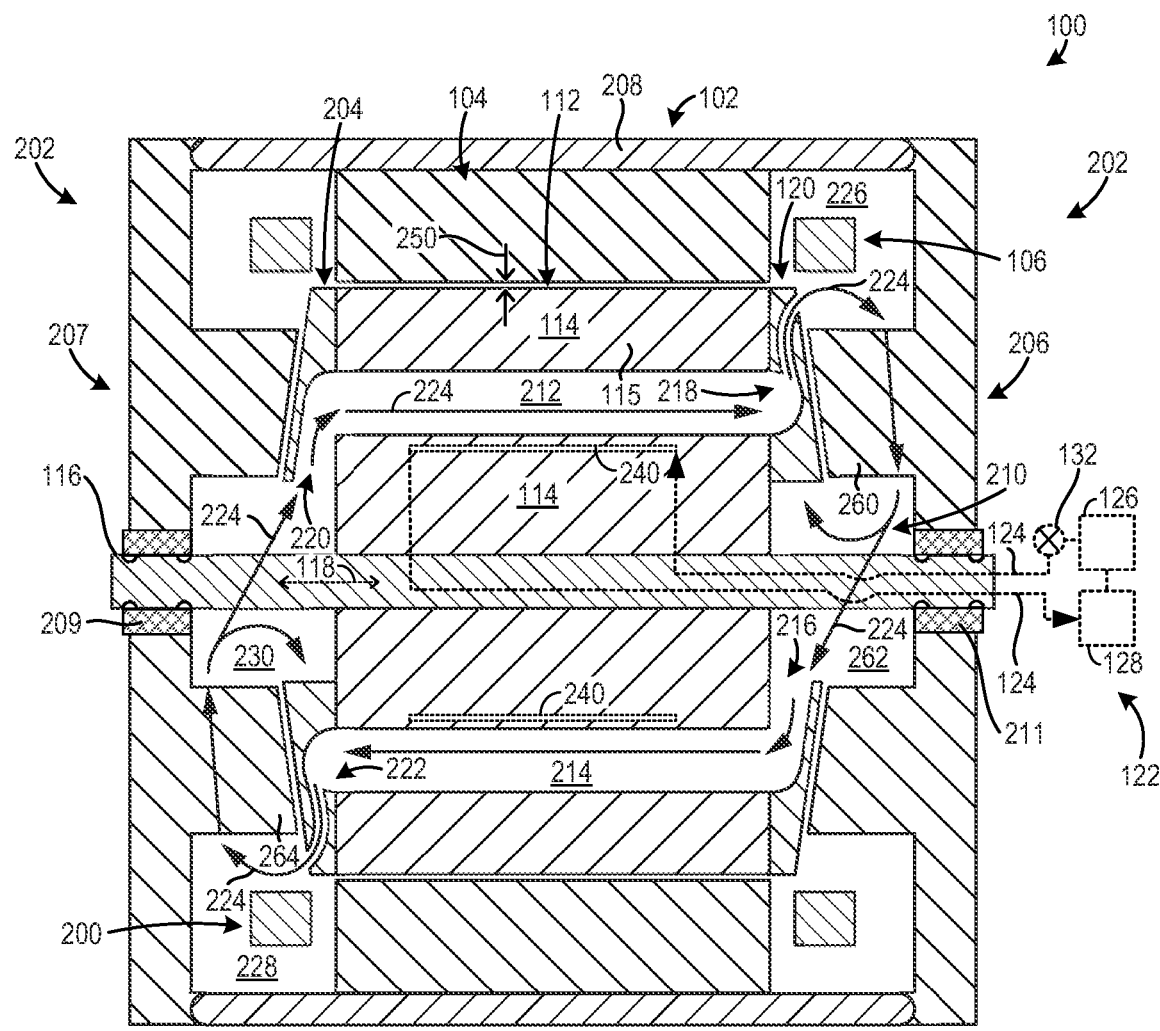
FIG. 2 shows a cross-sectional view of a cooling system in the electric motor, illustrated in FIG. 1.
Figure 2:
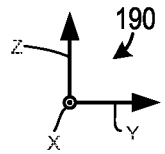

FIG. 2 illustrates another cross-sectional view of the electric motor 100. The housing 102, rotor 112, and stator 104 are again depicted. Specifically, the rotor shaft 116, the rotor core 114 with laminations 115, and the first stator end winding 106 are shown. The stator 104 also includes a second end winding 200. The end windings are positioned on opposing axial sides 202 of the electric motor 100. The first balancing plate 120 is shown along with a second balancing plate 204. The balancing plates 120, 204 are also arranged on opposing axial sides 202 of the electric motor 100. Additionally, the first and second balancing plates are radially offset with regard to one another. Put another way, the balancing plates are rotationally offset from one another.

The electric motor 100 also includes a pair of end caps 206, 207 (a first end cap 206 and a second end cap 207). The end caps 206, 207 may extend from the rotor shaft 116 to a body 208 of the housing 102. In this way, an enclosure may be formed in the electric motor. Bearings 209, 211 attached to the rotor shaft 116 as schematically depicted in FIG. 2. The bearings 209, 211 support and permit rotation of the rotor shaft. Roller element bearings, plain bearings, and the like may be selected for use based on motor design targets. The bearings 209, 211 are at least partially enclosed in the end caps 206, 207, in the illustrated embodiment. Additionally or alternatively, bearings may be positioned inboard or outboard of the end plates. The end caps 206, 207 may include a plurality of fins directing air from the end windings to a more centralized location near the rotor shaft. Various aspects of the end cap fins are described in greater detail herein with regard to FIG. 3. In other examples, however, the end caps 206, 207 may be omitted from the electric motor 100.

An air cooling system 210 is provided within the enclosure. The air cooling system 210 includes a plurality of passages allowing air to circulate through the motor's enclosure. To elaborate, a first axial air conduit 212 and a second axial air conduit 214 are shown extending through the rotor core 114. For example, the axial air conduits may extend through laminations in the rotor core. Directing air axially through the rotor laminations reduces hot spots in the rotor due to the rotor laminations exhibiting a higher radial thermal conductance than axial thermal conductance, in some instances. Further, in some examples, the axial air conduits 212, 214 may be formed via existing holes present in the rotor laminations or may be formed by expanding holes that are present in the rotor laminations. However, in other examples, the configuration of the lamination may be re-designed to include axial air conduits.

Additionally, the first axial air conduit 212 and the second axial air conduit 214 are radial offset from one another. The first balancing plate 120 includes an inlet air duct 216 and an outlet air duct 218. Likewise, the second balancing plate 204 includes an inlet air duct 220 and an outlet air duct 222. The inlet air duct 216 in the first balancing plate 120 serves as an inlet for the second axial air conduit 214 and the outlet air duct 222 in the second balancing plate 204 serves as an outlet for the second axial air conduit 214. Additionally, the outlet air duct 218 in the first balancing plate 120 serves as an outlet for the first axial air conduit 212 and the inlet air duct 220 in the second balancing plate 204 serves as an inlet for the second axial air conduit 214.

In one example, the outlet and inlet air ducts 216, 218, 220, 222 in the balancing plates 120, 204 may be profiled to passively generate airflow through the air cooling system 210 during motor operation. In such an example, centrifugal forces are used to drive the air circulation in the air cooling system 210. To elaborate, arrows 224 signify the direction of airflow through the airflow conduits, ducts, and other flow regions of the air cooling system 210 in the motor. It will be understood, that although the arrows signify the general direction of airflow in the system, in a more granular scale the airflow pattern may exhibit greater complexity.

As shown in FIG. 2, air travels in a first axial direction through the first axial air conduit 212 and into the outlet air duct 218 in the first balancing plate 120. As the air flows through the first axial air conduit 212 heat is transferred from the rotor core 114 to the air in the conduit. Next, air from the outlet air duct 218 is directed into a region 226 around the first stator end winding 106. In this way, heat from the end winding 106 can be transferred to the air to cool the end winding. It will be appreciated, that the end winding may still be cooled with air preheated by the rotor core due to the end winding typically being at a higher temperature than the rotor core, in some instances. The direction and velocity of the air exiting the outlet air duct 218 corresponds to the profile of the outlet air duct. As such, the geometry (e.g., cross-sectional profile, outflow angle, inflow angle, length, etc.) of the outlet air duct 218 may be selected to achieve a desired direction and velocity which generate a desired amount of turbulence in the region 226 around the first stator end winding 106. Generating turbulent airflow in the region 226 allows heat to be transferred from the first end winding 106 to the first end cap 206 and housing 102. In this way, increased air circulation along the housing and end caps is realized, facilitating the dissipation of the heat absorbed by the airflow through the rotor core and near the end windings to the surrounding environment.

Additionally, air exiting the outlet air duct 218 may flow towards the first end winding 106 and then through channels (e.g., radially aligned channels) in the first end cap 206 and/or around the first end winding 106 near the housing body 208. When the air flows around the first end winding 106 and adjacent to the housing body 208, heat is transferred from the air to the surrounding environment by way of the housing.

Figure 3:
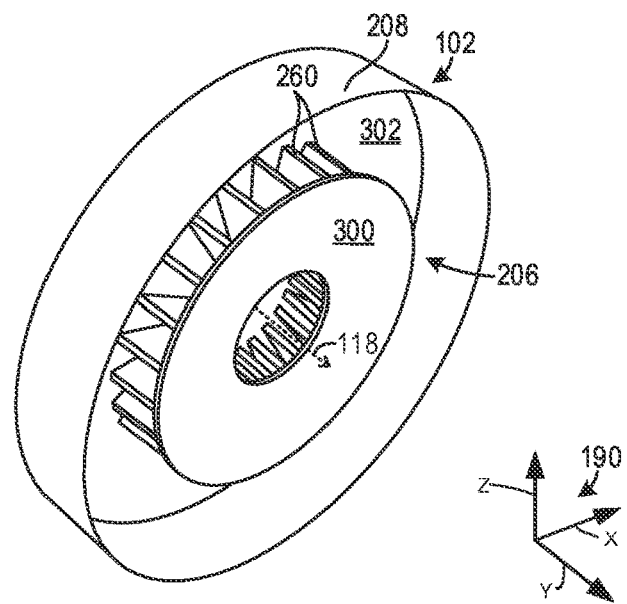
FIG. 3 shows a detailed view of an end cap in the electric motor, illustrated in FIG. 1.

The channels in the first end cap 206 may be formed via fins 260, shown in greater detail in FIG. 3, and discussed in greater detail herein. Directing air through the first end cap 206 in this manner allows heat to be transferred from first end winding 106 to the first end cap 206 and then to the surrounding environment. The air traveling through the channels in the first end cap 206 is directed toward the rotor shaft 116 upon exit into region 262. The air subsequently flows into the inlet air duct 216 in the first balancing plate 120 and then into the second axial air conduit 214. Air then flows in axial direction through the second axial air conduit 214 and into the outlet air duct 222 of the second balancing plate 204.

The general direction of air traveling through the first axial air conduit 212 and the second axial air conduit 214 opposes one another. Having a counter-flow arrangement in the cooling system can increase rotor core cooling uniformity. The air exiting the outlet air duct 222 is again directed to a region 228 around the second end winding 200. From the second end winding 200, the air travels through channels, formed via fins 264, in the second end cap 207 into a region 230 near the rotor shaft 116.

From the region 230 air flows the inlet air duct 220 in the second balancing plate 204 and then back into the first axial air conduit 212. Air may also flow from the region 230 to other air inlet ducts in the second balancing plate 204. Thus, the airflow pattern generally flows radially outwards through the outlet air ducts and then inward through the inlet air ducts in the balancing plates. It will be understood, that the airflow pattern may exhibit a continuous flow, allowing air to flow unbroken through the motor. Put another way, a continuous air path driven via suction and exhaust strokes in the cooling system conduits. Consequently, greater motor cooling may be achieved relative to systems without a continuous airflow pattern.

It will be appreciated, that the airflow circuit in the air cooling system 210 may be substantially sealed (e.g., fully closed). Thus, the airflow conduits, ducts, etc., in the system may be fluidly isolated from the surrounding atmosphere around the motor. As such, in one example, the cooling system may be designed to generate approximately no additional airflow through an air gap 250 between the stator 104 and the rotor 112. To elaborate, the net airflow through the air cooling system 210 may be substantially zero (e.g., zero) to avoid an increase in air gap flow. In this way, additional losses in the electric motor are decreased (e.g., avoided). It has been found, through computational fluid dynamic (CFD) testing of a motor with a use-case air cooling system with the characteristics described herein has relatively low losses (e.g., 130 watts (W) at 8000 revolutions per minute (RPM) compared to 120 W for a similar motor without the rotor cooling system). Thus, the motor may not experience a significant windage penalty when deploying the air cooling system 210. Moreover, the air cooling system may allow the motor to achieve torque gains due to the cooling.

In one example, the first and second balancing plates 120, 204 may be substantially equivalent in geometry and size but are arranged rotationally offset to allow the axial air conduits in the rotor 112 to have alternating suction and exhaust dynamics. In this way, air directed axially through the axial air conduits 212, 214. Due to the variation in suction and exhaust strokes there may be a relatively high turbulent flow at the flanges of the motor, thereby increasing heat transfer and motor cooling. Designing the balancing plates with a substantially identical size and profile also allows the air cooling system to achieve cooling functionality if the motor is designed to spin in a reverse direction, during reverse drive operation or a regeneration mode, in a vehicle use-case scenario, if desired.

Furthermore, rotationally offsetting the first and second balancing plates 120, 204 allows the general direction of airflow in the first axial air conduit 212 and the second axial air conduit 214 to oppose one another in a counter-flow arrangement. Manufacturing costs of the electric motor may be reduced because of the similar sizing and profiling of the balancing plates.

The liquid cooling system 122 is shown again in FIG. 2 with the pump 126, heat exchanger 128, valve 132, and fluid passages 124, 240. To elaborate, the fluid passages 240 may be arranged adjacent to the first axial air conduit 212 and/or the second axial air conduit 214. However, as previously discussed the liquid cooling system may be omitted from the electric motor, in some embodiments.

The housing 102 and end caps 206, 207 may be constructed out of a metal such as steel, aluminum, combinations thereof, etc. In one specific example, the housing and end caps may comprise aluminum due to its higher thermal conductivity than steel, for example. However, housing and/or end caps constructed out of steel may be used due to its lower cost and/or durability. The wires in the end windings 106, 200 may be constructed out of an electrically conductive material such as copper. The stator may also be constructed out of steel (e.g., laminated steel). Additionally, the balancing plates 120, 204 may be constructed out of a metal (e.g., steel, aluminum, combinations, etc.). Additionally, the rotor 112 may be constructed out of steel, copper, aluminum, etc.

FIG. 3 depicts a detailed view of the first end cap 206 and the body 208 of the housing 102. The first end cap 206 is shown including an inner plate 300 which may be adjacent to the first balancing plate 120, shown in FIG. 2. The first end cap 206 further includes an outer plate 302 coupled to the housing 102. The plurality of fins 260 extend between the inner plate 300 and the outer plate 302. The fins 260 are designed to route air from the region around stator end winding to a central region of the motor near the inlet ducts of the balancing plates 120, 204, shown in FIG. 2. It will be appreciated that this airflow pattern allows the air to be cooled as it flows through the first end cap 206 due to the heat transfer from the end cap and housing to the surrounding environment. Specifically, in the illustrated embodiment, the fins 260 are radially aligned and include two opposing planar side. However, curved fins and non-radially aligned fins arrangements have been envisioned.

It will be understood, that the second end cap 207, shown in FIG. 2, may have a similar size and geometric profile as the first end cap 206. Designing the end caps in this manner can allow the production cost of the motor to be decreased, if desired. However, alternatively, the end caps may have a different size and/or profile. Packaging and other design goals may be taken into account when selecting the size and shape of the end caps.

Figure 4:
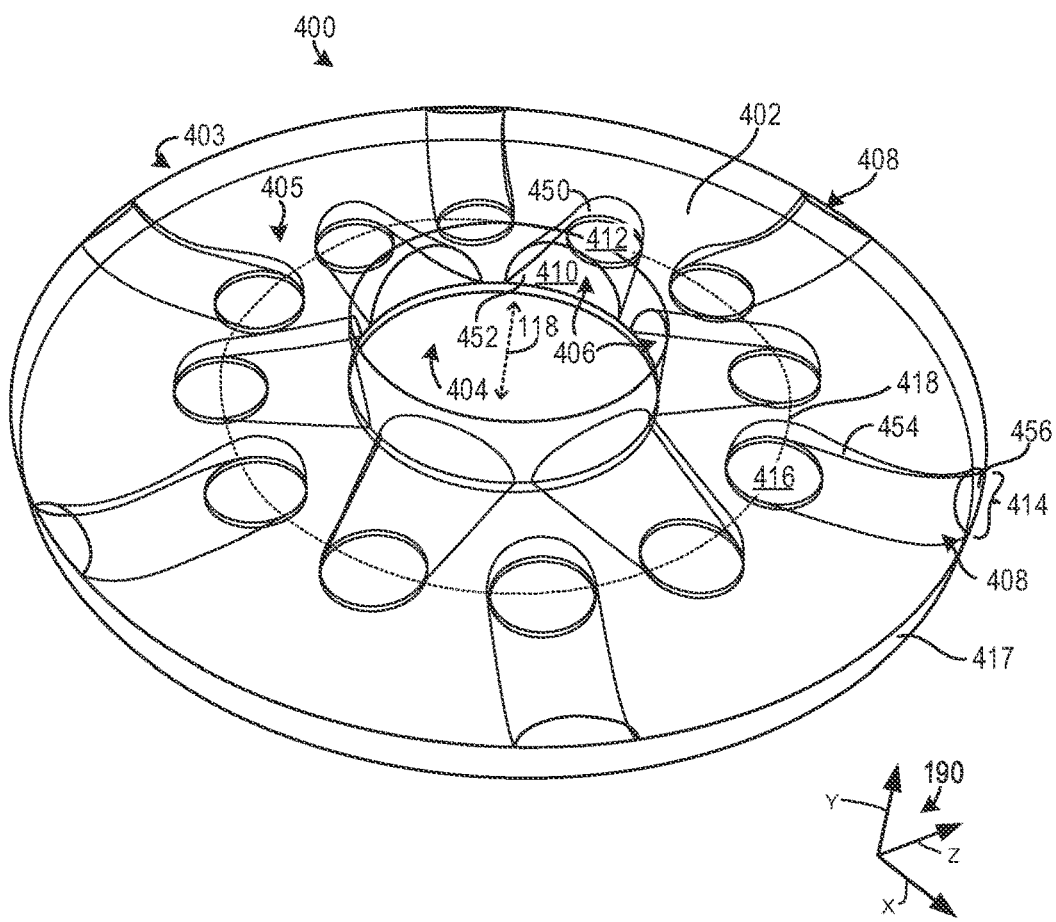
FIG. 4 shows a detailed view of a balancing plate in the electric motor, illustrated in FIG. 1.

FIG. 4 shows a detailed view of an example of a balancing plate 400. It will be appreciated that the balancing plate 400 shown in FIG. 4 is an example of one of the balancing plates 120, 204, shown in FIG. 2. Therefore, the structural and functional features in the balancing plate 400, shown in FIG. 4, may be included in any of the balancing plates shown in FIG. 2 or vice-versa.

The balancing plate 400 includes a body 402 with a central opening 404. The body 402 includes a first axial side 403 and a second axial side 405. When installed in the motor, the first axial side 403 may be adjacent to the rotor core and the second axial side 405 may be adjacent to the stator end windings and one of the end caps. The balancing plate 400 also includes a plurality of inlet air ducts 406 and a plurality of outlet air ducts 408. FIG. 4 depicts the inlet and outlet air ducts in a see-through style illustration to reveal the size, positioning, and shape of the ducts. The number of inlet and outlet air ducts may be an integer multiple of the axial air conduits in the rotor core. For instance, the rotor may have six air conduits and six or twelve inlet and outlet air ducts, in one use-case scenario. The inlet air ducts 406 and the outlet air ducts 408 extend in a radial direction, in the depicted embodiment. However, non-radial duct arrangements have been envisioned. Additionally, the balancing plate 400 shown in FIG. 4 has radial symmetry to reduce rotational imbalances in the rotor. However, differently contoured balancing plates (e.g., radially asymmetric plates) have been contemplated. It will be understood that air in the central opening 404 may have a relatively low pressure to drive air circulation through the air conduits, ducts, etc., in the air cooling system.

The inlet air ducts 406 each include a first opening 410 in fluidic communication with a central opening 404 near a rotor shaft, such as the rotor shaft 116 shown in FIG. 2. Likewise, a second opening 412 in fluidic communication with one of a plurality of axial air conduits, such as the axial air conduits 212, 214, shown in FIG. 2. Positioning the inlet air ducts 406 in this layout allows centrifugal forces to drive airflow from the central region into the air conduits. The second opening 412 may be profiled, in some cases, similar to the opening into the airflow ducts, to decrease losses in the cooling system. For example, the second opening 412 of the inlet air ducts 406 and the opening of the axial air conduits may have a circular, oval, arcuate, or wedge shape in some instances. However, polygonal opening cross-sections have also been envisioned. The first opening 410 of each inlet air ducts 406 may have an arcuate or other suitable profile allowing for air pick-up into the corresponding axial air conduit.

Furthermore, in one example, the cross-sectional area of each of the inlet air ducts 406 may decrease from the first opening 410 to the second opening 412. However, in other examples, the inlet air ducts 406 may have a substantially constant cross-sectional area along their lengths or, in some examples, may increase in cross-sectional area from the first opening to the second opening. Each of the inlet air ducts 406 may also include a curved section 450 and a substantially planar section 452 bounding the ducts. In this way, the ducts may be profiled to space efficiently integrate into the balancing plate while achieving a desired cross-sectional area. However, alternate inlet air duct shapes have been contemplated such as ducts having a curved boundary around their circumference, ducts with a polygonal cross-section, etc. For instance, in one use-case example, the inlet air ducts may have a round or oval cross-section along at least a portion of the duct.

The outlet air ducts 408 each include a first opening 414 opening into a region near a stator end winding, such as the stator end winding 106, shown in FIG. 2. The outlet air ducts 408 also each include a second opening 416 opening into the axial air conduits. The second opening 416 is adjacent to a peripheral surface 417 of the plate 400, in the illustrated embodiment. However, in other embodiments, the second openings may be spaced away from the peripheral surface. Each of the outlet air ducts 408 may decrease in its cross-sectional area from the first opening to 414 the second openings 416. In this way, the velocity of the air exiting the outlet air ducts may be increased to promote turbulent airflow around the stator end windings. However, in other examples, the cross-sectional area of the outlet air ducts may be substantially constant or, in certain examples, increase along its lengths.

Each of the outlet air ducts 408 may also include a curved section 454 and a substantially planar section 456 bounding the ducts. In this way, the ducts may be profiled to space efficiently integrate into the balancing plate while achieving a desired cross-sectional area. However, alternate outlet air duct shapes have been contemplated such as ducts having a curved boundary around their circumference, ducts with polygonal cross-sections, etc. For instance, in one use-case example, the inlet air ducts may have a round or oval cross-section along at least a portion of the duct.

The first openings 414 of each of the outlet air ducts 408 may exhibit an arcuate shape or other shape angled to direct turbulent airflow at the stator's end windings. To elaborate, the first openings 414 of each outlet air ducts may seal (e.g., perfectly seal) against the rotor lamination cavities, in one example. Further, the second openings of each outlet air ducts may have a shape that forces the airflow to hit toward the end windings of the stator. In this way, greater stator cooling may be achieved, thereby increasing motor efficiency, in some cases.

It will also be appreciated that the first opening 410 of each of the inlet air ducts 406 may have a similar size and profile to avoid rotational imbalances. Likewise, the second opening 412 of each of the air inlet ducts 406 may have a similar size and profile. However, in other embodiments, the air inlet ducts may have sets of differently profiled and/or sized openings symmetrically arranged to achieve symmetry about a diameter of the balancing plate 400. The first opening 414 of each of the outlet air ducts 408 also have a similar size and profile and the second opening 416 of each of the outlet air ducts may also have a similar size and profile. However, embodiments where the openings have differently sized/profiled sets have also been envisioned.

The second openings 412 of the inlet air ducts 406 and the second openings 416 of the outlet air ducts 408 are shown sequentially arranged around a circumference 418 of the body 402 of the balancing plate 400. The inlet air ducts 406 extend radially inward from this circumference while the outlet air ducts 408 extend radial outward from the circumference. However, in other examples, the second openings in the inlet air ducts and the second openings in the outlet air ducts may have different circumferential positions. Specifically, in one example, the second openings 412 from the inlet ducts may be radially closer to motor's rotational axis 118 than the second openings 416 of the outlet ducts.

Figure 5:
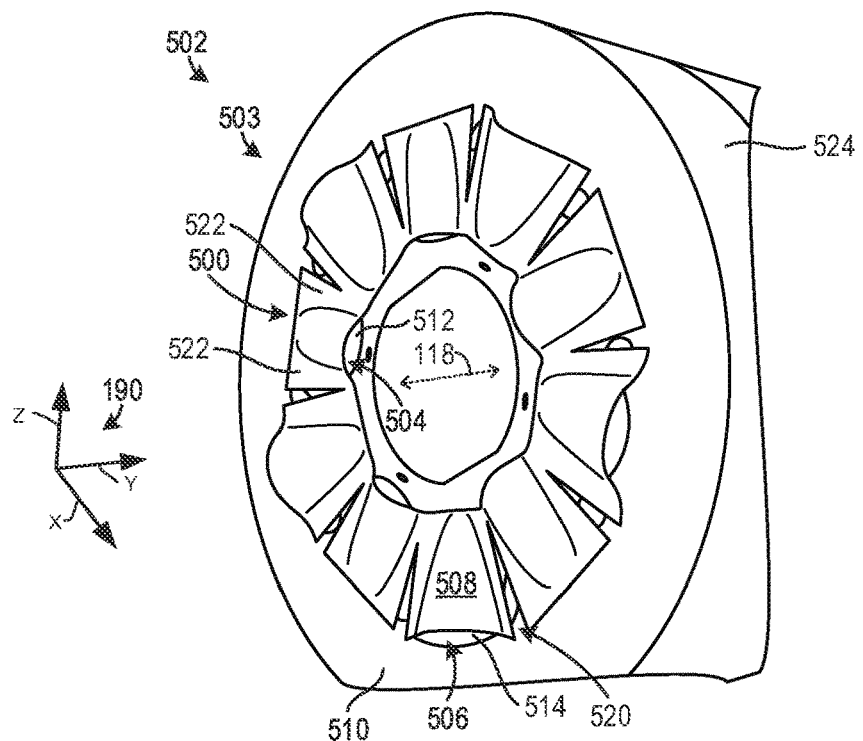
FIG. 5 shows a second example of a balancing plate in an electric motor rotor.

FIG. 5 shows another example of a balancing plate 500 coupled to a rotor 502 with a core 503 of an electric motor. It will be understood that the example of the balancing plate 500 shown in FIG. 5 may be an alternative to one of the balancing plates 120, 204 in the electric motor 100, shown in FIG. 2. The balancing plate 500 includes inlet air ducts 504 and outlet air ducts 506 arranged in an alternating pattern circumferentially extending around the balancing plate 500. To elaborate, the inlet and outlet air ducts 504, 506 are formed in a continuous body 508 attached to an axial side 510 of the rotor 502.

The inlet and outlet air ducts 504, 506 are formed via raised sections in the balancing plate 500 curving axial outward from the rotor core 503, in the illustrated embodiment. However, other inlet and outlet ducts configurations have been envisioned. Additionally, in the illustrated embodiment, gaps 520 are formed between sequential inlet and outlet air ducts 504, 506. In this way, the weight of the balancing plate may be decreased in comparison to plates without the gaps. However, in other examples, material may be provided in the regions between the ducts. Sections 522 of the plates may be coupled (e.g., welded, mechanically attached, etc.) to the rotor core 503 adjacent to the inlet and outlet air ducts 504, 506, to fluidly separate the ducts. The inlet and outlet air ducts 504, 506 are again configured to, during rotation, generate airflow through air conduits axially extending through the rotor core.

The inlet air ducts 504 each include an opening 512 and when installed in a motor may be adjacent to a central region of the motor around a rotor shaft. The outlet air ducts 506 also each include an opening 514 designed to, when installed in the motor, direct air towards a region around stator end windings. The openings 514 are positioned radially inward from a peripheral surface 524 of the rotor core 503, in the illustrated embodiment. However, the balancing plate may extend beyond the peripheral surface of the rotor core, in other embodiments.

Figure 6:
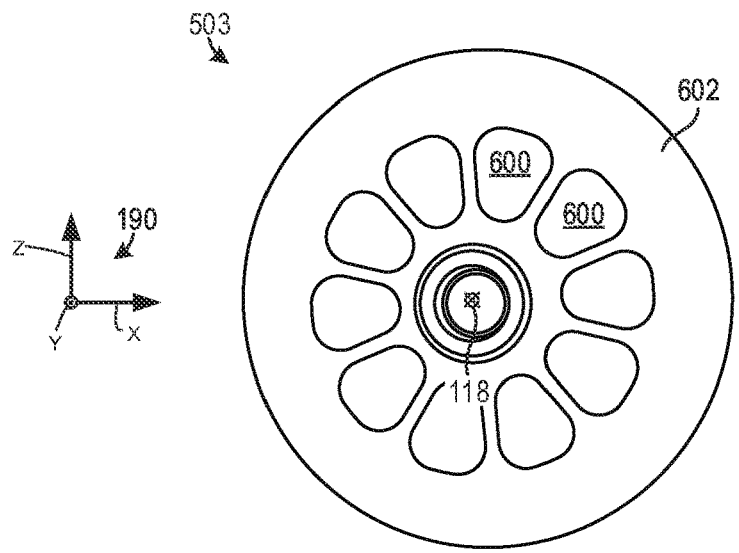
FIG. 6 shows a detailed view of a rotor core included in the electric motor rotor, illustrated in FIG. 5.

FIG. 6 shows a detailed view of the rotor core 503. The axial air conduits 600 extending through a plurality of laminations 602 are shown in FIG. 6. It will be appreciated that the inlet air ducts 504 and the outlet air ducts 506, illustrated in FIG. 5, include openings in fluidic communication with the axial air conduits 600. Similar to the previously described axial air conduits air may sequentially flow in opposing axial direction through the axial air conduits 600 due to a rotationally offset arrangement of the balancing plates in the rotor stack.

Figure 7:
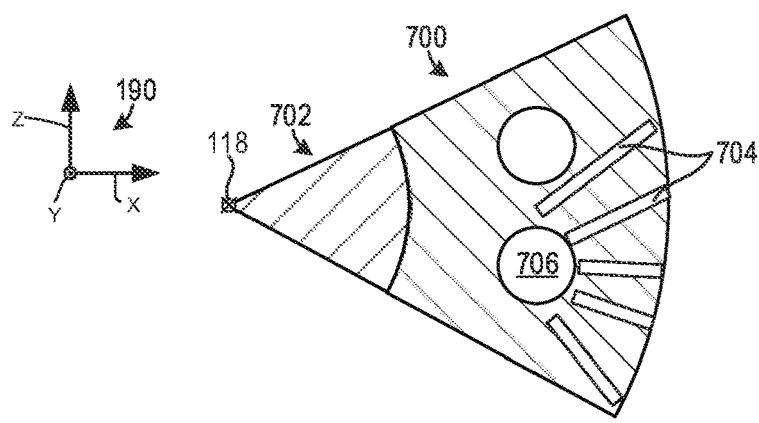
FIG. 7 shows a third example of a balancing plate.

FIG. 7 depicts another embodiment of a balancing plate 700 coupled to a rotor core 702. The balancing plate 700 includes a plurality of louvers 704 extending from an opening 706 in fluidic communication with an axial air conduit in a rotor when the balancing plate is assembled in a motor cooling system. The louvers 704 are profiled to direct air towards stator end windings. Specifically, the louvers 704 may be designed to substantially uniformly direct air towards stator end windings. The louvers 704 are depicted as walls with two opposing planar surfaces. However, other louver shapes have been envisioned, such as louvers with at least one curved surface. Additionally, the louvers 704 are illustrated with an open design. However, louvers with a closed design having a cap extending between the walls have been contemplated. The balancing plate 700 may also include louvers profiled to direct air into an opening in an axial air conduit in the rotor core. In this way, the louvers may function as the previously described inlet and outlet air ducts in the balancing plates. Further in one example, the rotor stack may include suction openings that extend radially inwards. In such an example, louvers may not be used for the inlet ducts. As such, air may directly enter the air cavities inside the rotor core.

FIGS. 1-7 and 9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Figure 8:
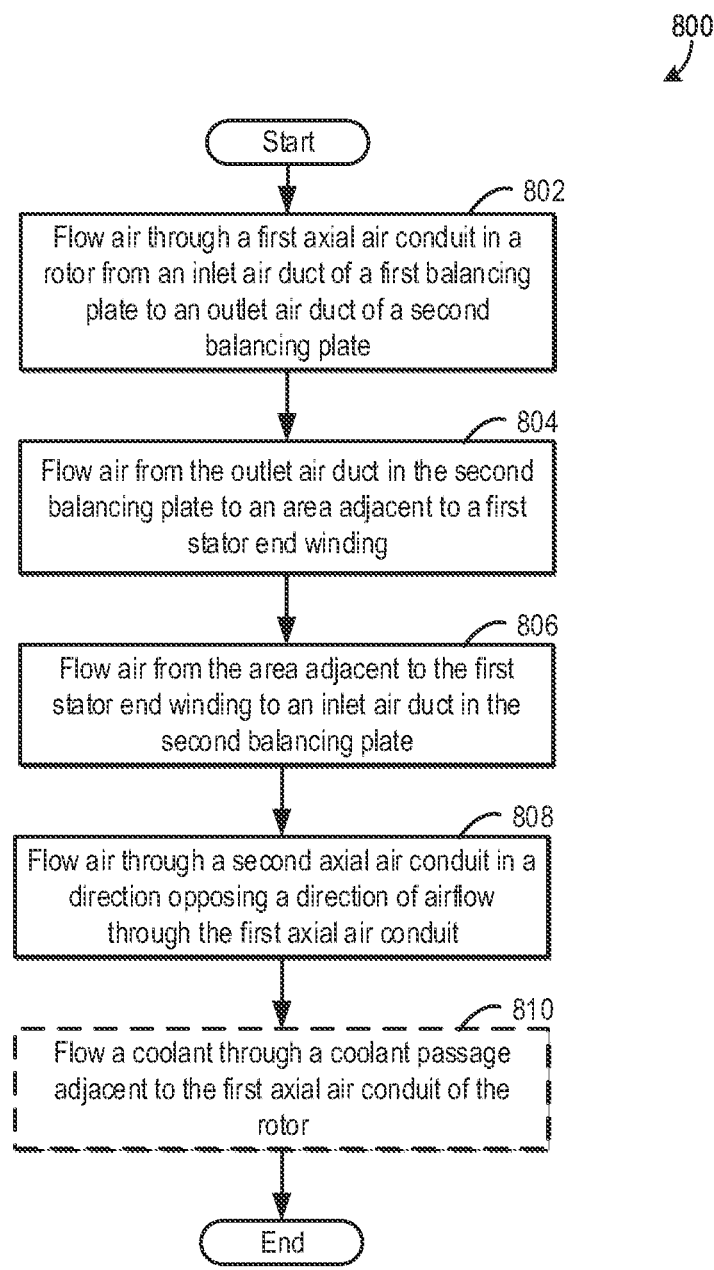
FIG. 8 shows a method for operation of an electric motor cooling system.

FIG. 8 depicts a method 800 for operation of a cooling system in an electric motor. The method 800 may be implemented by any of the cooling systems and electric motors described with regard to FIGS. 1-7 and/or FIG. 9. However, in other examples, the method may be implemented by other suitable cooling systems and electric motors. The motor may be controlled using instructions stored in non-transitory memory executable by a processor in a controller. Further, at least a portion of the steps may be passively implemented. For example, once the rotor is spinning during electric motor operation, the air circulation steps may passively occur.

At 802, the method includes flowing air through a first axial air conduit in a rotor from an inlet air duct of a first balancing plate to an outlet air duct of a second balancing plate. In this way, air enters and exits axial conduits in the rotor via the balancing plates. It will be appreciated that centrifugal forces generated by rotor rotation drives the airflow pattern occurring in step 802.

Next at 804, the method includes flowing air from the outlet air duct in the second balancing plate to an area adjacent to a first stator end winding. In this way, the second balancing plate is contoured to direct airflow (e.g., turbulent airflow) around the end winding. As such, heat from the end windings may be transferred to the circulated air.

Next at 806, the method includes flowing air from the area adjacent to the first stator end winding to an inlet air duct in the second balancing plate. For instance, air may be flowed through passages in the end caps and then to a region adjacent to a rotor shaft before entering the inlet air duct in the second balancing plates. The air may be cooled as a result of this airflow. To elaborate, heat is transferred to the end cap and the motor housing from the air traveling therethrough. In this way, rotor core cooling is achieved.

Next at 808, the method includes flowing air through a second axial air conduit in a direction opposing a direction of airflow through the first axial air conduit. In this way, a counter-flow pattern may be realized in the rotor core, thereby increasing rotor cooling uniformity. Air may then flow through an outlet air duct in the second balancing plate toward a second end winding and then through a second end cap and/or near a housing. It will be appreciated that in an air cooling system with additional axial air conduits, after the air travels near/through the second end cap and housing, the airflow pattern indicated in steps 802-808 may be repeated through different axial air conduits, ducts, etc., until air reaches the air inlet duct of the first axial air conduit.

At 810, the method, in one example, may optionally include flowing coolant through a coolant passage adjacent to the first axial air conduit of the rotor. For instance, a pump in a coolant loop may drive coolant circulation through the coolant passage and then to a heat exchanger. In this way, coolant may be used to remove additional heat from the rotor core and the air flowing therethrough, resulting in additional core cooling. In such an example, the coolant passage may also be arranged adjacent to the second axial air conduit, to achieve further cooling, in some instances. However, in other examples, step 810 may be omitted from the method and the motor cooling system may therefore forgo a liquid cooling system, thereby decreasing the cost and complexity of the cooling system.

As an alternative to step 810 or as an additional step, the method may include flowing air and/or water around an outer surface of the motor housing. For instance, air may flow across heat fins that extend from the housing and/or water may be flowed through a water jacket at least partially surrounding the housing. In this way, the motor may be further cooled to increase motor efficiency.

The air cooling systems and methods for the electric motor, described herein, have the technical effect of increasing motor efficiency via a reduction in the temperature of the motor's rotor core and end windings. Motor lifespan may also be increased as a result of the motor cooling.

The invention will be further described in the following paragraphs. In one aspect, an electric motor system is provide that comprises: a rotor with a plurality of axial air conduits; a first balancing plate positioned on a first axial side of the rotor, the first balancing plate having an inlet air duct and an outlet air duct; and a second balancing plate positioned on a second axial side of the rotor, the second balancing plate having an inlet air duct and an outlet air duct; wherein the inlet air duct in the first balancing plate is radially offset from the inlet air duct in the second balancing plate.

In another aspect, a method for cooling an electric motor system is provided that comprises: flowing air through a first axial air conduit in a rotor from an inlet air duct of a first balancing plate to an outlet air duct of a second balancing plate, wherein the first and second balancing plates are positioned on axially opposing sides of the rotor; and flowing air from the outlet air duct in the second balancing plate to an area adjacent to a first stator end winding. In one example, the method may further comprise flowing air from the area adjacent to the first stator end winding to an inlet air duct in the second balancing plate. In another example, the method may further comprise flowing air through a second axial air conduit in a direction opposing a direction of airflow through the first axial air conduit. Further in one example, the method may further comprise flowing a coolant through a coolant passage adjacent to the first axial air conduit of the rotor. Still further in one example, the method may further comprise flowing coolant and/or air in or around a housing of the electric motor system. In yet another example, the method step of flowing air from the area adjacent to the first stator end winding to the inlet air duct in the second balancing plate may include flowing through a region adjacent to a rotor shaft.

In yet another aspect, an electric motor system is provided that comprises: a rotor with a plurality of axial air conduits extending through a plurality of laminations; a first balancing plate positioned on a first axial side of the rotor, the first balancing plate having an inlet air duct and an outlet air duct; and a second balancing plate positioned on a second axial side of the rotor, the second balancing plate having an inlet air duct and an outlet air duct; wherein the rotor is configured to, during operation, circulate air through the plurality of axial air conduits and the inlet air ducts and the outlet air ducts in the first and second balancing plates via centrifugal forces.

In any of the aspects or combinations of the aspects, the first and second balancing plates may be radially symmetric.

In any of the aspects or combinations of the aspects, the inlet air duct and the outlet air duct in the first balancing plate may radially extend therethrough and the inlet air duct and the outlet air duct in the second balancing plate may extend radially therethrough.

In any of the aspects or combinations of the aspects, the inlet air duct in the first balancing plate may extend radially inward through a body of the first balancing plate and the outlet air duct in the first balancing plate extends radially outward through the body of the first balancing plate.

In any of the aspects or combinations of the aspects, the plurality of axial air conduits may extend through a plurality of rotor laminations.

In any of the aspects or combinations of the aspects, the outlet air duct in the first balancing plate may direct air towards a first stator end winding and the outlet air duct in the second balancing plate may direct air towards a second stator end winding.

In any of the aspects or combinations of the aspects, the first stator end winding and the second stator end winding may be positioned on axially opposing sides of a stator.

In any of the aspects or combinations of the aspects, the outlet air ducts and the inlet air ducts in the first and second balancing plates may be formed via a plurality of louvers.

In any of the aspects or combinations of the aspects, wherein during rotor operation, the rotor may be configured to passive generate airflow through the plurality of axial air conduits and the inlet air ducts and the outlet air ducts in the first and second balancing plates.

In any of the aspects or combinations of the aspects, a net airflow through the electric motor system may be substantially zero.

In any of the aspects or combinations of the aspects, the electric motor system may further comprise an end cap positioned on an axial side of the electric motor system and a plurality of fins, wherein the plurality of fins are designed to direct air adjacent to a first stator end winding to the inlet air duct in the end cap.

In any of the aspects or combinations of the aspects, the inlet air duct and the outlet air duct in the first balancing plate may axially extend therethrough and the inlet air duct and the outlet air duct in the second balancing plate may extend axially therethrough.

In any of the aspects or combinations of the aspects, the inlet air ducts may radially extend inward toward an axis of rotation, the outlet air ducts radially extend outward away from the axis of rotation, and the outlet air ducts each generate turbulent airflow around a corresponding stator end winding.

In any of the aspects or combinations of the aspects, the first and second balancing plates may each be radially symmetric and may be arranged rotationally offset in relation to one another.

In another representation, a passive electric machine cooling system is provided that comprises a plurality of symmetrically arranged air ducts extending through a plurality of rotor core laminations and balancing plates including air conduit inlets and outlets designed to generate suction and exhaust airflow patterns in opposing axial ends of the rotor core during rotation of the rotor.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example cooling method included herein can be used with various motor system configurations. The various actions, operations, and/or functions illustrated may be performed in the sequence illustrated, in parallel, or in some cases omitted. Likewise, the order of the steps is not necessarily required to achieve the features and advantages of the example examples described herein, but is provided for ease of illustration and description. One or more of the illustrated actions, operations, and/or functions may be repeatedly performed depending on the particular strategy being used. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric motor system, comprising:
a rotor with a plurality of axial air conduits that are straight and axially extend through a rotor core front a first axial side to a second axial side;
a first balancing plate positioned on the first axial side of the rotor, the first balancing plate comprising an inlet air duct and an outlet air duct;
a second balancing plate positioned on the second axial side of the rotor, the second balancing plate comprising an inlet air duct and an outlet air duct; and
an end cap coupled to a body of a housing;
wherein the body at least partially circumferentially surrounds a stator;
wherein the end cap is positioned on an axial side of the electric motor system;
wherein the end cap includes a plurality of fins positioned radially inward from a stator end winding and radially inward from an air gap between the rotor core and the stator, and the plurality of fins positioned so as to extend axially inward toward the first balancing plate;
wherein the plurality of fins direct air from a region surrounding the stator end winding to a region adjacent to and in fluid communication with the rotor shaft so that air directed from the region surrounding the stator end winding flows around the rotor shaft and axially through the rotor core; and
wherein the inlet air duct in the first balancing plate is radially offset from the inlet air duct in the second balancing plate.

2. The electric motor system of claim 1, wherein the first and second balancing plates are radially symmetric.

3. The electric motor system of claim 1, wherein the inlet air duct and the outlet air duct in the first balancing plate radially extend therethrough and the inlet air duct and the outlet air duct in the second balancing plate extend radially therethrough.

4. The electric motor system of claim 3, wherein the inlet air duct in the first balancing plate extends radially inward through a body of the first balancing plate and the outlet air duct in the first balancing plate extends radially outward through the body of the first balancing plate.

5. The electric motor system of claim 1, wherein the plurality of axial air conduits extend through a plurality of rotor laminations.

6. The electric motor system of claim 1, wherein the outlet air duct in the first balancing plate directs air towards a first stator end winding and the outlet air duct in the second balancing plate directs air towards a second stator end winding.

7. The electric motor system of claim 6, wherein the first stator end winding and the second stator end winding are positioned on axially opposing sides of a stator.

8. The electric motor system of claim 1, wherein the outlet air ducts and the inlet air ducts in the first and second balancing plates are formed via a plurality of louvers.

9. The electric motor system of claim 1, wherein during rotor operation, the rotor is configured to passively generate airflow through the plurality of axial air conduits and the inlet air ducts and the outlet air ducts in the first and second balancing plates.

10. The electric motor system of claim 9, wherein a net airflow through the electric motor system is substantially zero.

11. The electric motor system of claim 1, wherein the inlet air duct and the outlet air duct in the first balancing plate axially extend therethrough and the inlet air duct and the outlet air duct in the second balancing plate extend axially therethrough.

12. A method for cooling an electric motor system, comprising:
flowing air through a first axial air conduit in a rotor from an inlet air duct of a first balancing plate to an outlet air duct of a second balancing plate, wherein the first and second balancing plates are positioned on axially opposing sides of the rotor;
flowing air from the outlet air duct in the second balancing plate to an area adjacent to a first stator end winding; and
flowing air from the area adjacent to the first stator end winding to an area adjacent to and in fluid communication with a rotor shaft via a plurality of channels formed in a plurality of fins;
wherein the plurality of fins are included in an end cap that is coupled to a body of a housing;
wherein the body at least partially circumferentially surrounds a stator;
wherein the end cap is positioned on an axial side of the electric motor system;
wherein the plurality of fins are positioned radially inward from the first stator end winding and radially inward from an air gap between a rotor core of the rotor and the stator, and the plurality of fins are positioned so as to extend axially inward toward the first balancing plate;
wherein the first axial air conduit is straight and axially extends through the rotor core front a first axial side to a second axial side; and
wherein the plurality of fins direct air from the area adjacent to the first stator end winding to the area adjacent to and in fluid communication with the rotor shaft so that air directed from the area adjacent to the first stator end winding flows around the rotor shaft and axially through the rotor core.

13. The method of claim 12, further comprising flowing air from the area adjacent to the first stator end winding to an inlet air duct in the second balancing plate.

14. The method of claim 13, wherein flowing air from the area adjacent to the first stator end winding to the inlet air duct in the second balancing plate includes flowing through a region adjacent to the rotor shaft.

15. The method of claim 12, further comprising flowing air through a second axial air conduit in a direction opposing a direction of airflow through the first axial air conduit.

16. The method of claim 12, further comprising flowing a coolant through a coolant passage adjacent to the first axial air conduit of the rotor.

17. An electric motor system, comprising:
- a rotor with a plurality of axial air conduits that are straight and axially extend through a plurality of laminations in a rotor core;
- a first balancing plate positioned on a first axial side of the rotor, the first balancing plate comprising an inlet air duct and an outlet air duct;
- a second balancing plate positioned on a second axial side of the rotor, the second balancing plate comprising an inlet air duct and an outlet air duct; and
- an end cap coupled to a body of a housing;
- wherein the body at least partially circumferentially surrounds a stator;
- wherein the end cap is positioned on an axial side of the electric motor system;
- wherein the end cap includes a plurality of fins positioned radially inward from a stator end winding and radially inward from an air gap between the rotor core rotor and the stator, and the plurality of fins positioned so as to extend axially inward toward the first balancing plate;
- wherein the plurality of fins direct air from a region surrounding the stator end winding to a region adjacent to and in fluid communication with the rotor shaft so that air directed from the region surrounding the stator end winding flows around the rotor shaft and axially through the rotor core; and
- wherein the rotor is configured to, during operation, circulate air through the plurality of axial air conduits and the inlet air ducts and the outlet air ducts in the first and second balancing plates via centrifugal forces.

18. The electric motor system of claim 17, wherein the inlet air ducts radially extend inward toward an axis of rotation, the outlet air ducts radially extend outward away from the axis of rotation, and the outlet air ducts each generate turbulent airflow around a corresponding stator end winding.

19. The electric motor system of claim 17, wherein the first and second balancing plates are each radially symmetric and are arranged rotationally offset in relation to one another.

* * * * *